(12) United States Patent
Hwang et al.

(10) Patent No.: US 9,036,630 B2
(45) Date of Patent: May 19, 2015

(54) METHOD AND APPARATUS FOR TRANSMITTING DATA PACKET OF MULTIMEDIA SERVICE USING MEDIA CHARACTERISTICS

(75) Inventors: Sung-Oh Hwang, Yongin-si (KR);
Doug-Young Suh, Seongnam-si (KR);
Kyung-Mo Park, Seoul (KR);
Yong-Hun Lee, Suwon-si (KR); Jun-Oh Kim, Suwon-si (KR); Jae-Yeon Song, Seoul (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

(21) Appl. No.: 13/495,621

(22) Filed: Jun. 13, 2012

(65) Prior Publication Data
US 2012/0320911 A1    Dec. 20, 2012

(30) Foreign Application Priority Data

Jun. 14, 2011 (KR) .......................... 10-2011-0057699

(51) Int. Cl.
*H04L 12/56* (2006.01)
*H04N 21/2362* (2011.01)
*H04L 12/913* (2013.01)
(Continued)

(52) U.S. Cl.
CPC .......... *H04N 21/2362* (2013.01); *H04L 47/806* (2013.01); *H04L 47/724* (2013.01); *H04L 47/801* (2013.01); *H04L 47/805* (2013.01); *H04L 47/824* (2013.01); *H04N 21/23406* (2013.01); *H04N 21/234327* (2013.01);
(Continued)

(58) Field of Classification Search
CPC ....... H04L 47/10; H04L 45/00; H04L 49/351; H04L 29/06; H04L 29/0653
USPC .......................................... 370/389, 473, 474
See application file for complete search history.

(56) References Cited

U.S. PATENT DOCUMENTS 5,107,780 A * 4/1992 Braun ........................... 112/314
6,031,963 A * 2/2000 Kitamura et al. ............. 386/329
(Continued)

FOREIGN PATENT DOCUMENTS

KR 10-2001-0102435 A 11/2001
KR 10-2008-0045276 A 5/2008
(Continued)

OTHER PUBLICATIONS

IEEE Std 802.16-2004.*
(Continued)

*Primary Examiner* — Melvin Marcelo
*Assistant Examiner* — Peter Solinsky
(74) *Attorney, Agent, or Firm* — Jefferson IP Law, LLP

(57) ABSTRACT

A method of transmitting a data packet of a multimedia service is provided. The method includes generating a media characteristic corresponding to a single media content component or aggregated media characteristics corresponding to a plurality of multimedia content components, obtaining information used for generating the data packet from the generated media characteristics or aggregated media characteristics, and generating the data packet based on the obtained information used for generating the data packet and transmitting the generated data packet.

14 Claims, 5 Drawing Sheets

(51) Int. Cl.
    *H04N 21/234*     (2011.01)
    *H04N 21/236*     (2011.01)
    *H04N 21/84*     (2011.01)
    *H04L 12/927*     (2013.01)
    *H04L 12/911*     (2013.01)
    *H04N 21/2343*     (2011.01)
    *H04N 21/24*     (2011.01)

(52) U.S. Cl.
    CPC ............ *H04N 21/236* (2013.01); *H04N 21/84* (2013.01); *H04N 21/2402* (2013.01)
    USPC ........................................................ 370/389

(56) References Cited

U.S. PATENT DOCUMENTS

| | | | | |
|---|---|---|---|---|
| 6,639,746 | B1 * | 10/2003 | Chung et al. | 360/55 |
| 7,336,624 | B2 * | 2/2008 | Hattig | 370/255 |
| 7,646,828 | B2 | 1/2010 | Song et al. | |
| 8,432,846 | B2 * | 4/2013 | Guo et al. | 370/312 |
| 2001/0007568 | A1 | 7/2001 | Morris | |
| 2001/0022785 | A1 * | 9/2001 | Pessi | 370/352 |
| 2002/0021321 | A1 * | 2/2002 | Nakajima et al. | 347/19 |
| 2006/0168133 | A1 * | 7/2006 | Park et al. | 709/219 |
| 2007/0081586 | A1 | 4/2007 | Raveendran et al. | |
| 2007/0086481 | A1 | 4/2007 | Klemets | |
| 2009/0138415 | A1 * | 5/2009 | Lancaster | 706/11 |
| 2010/0260254 | A1 * | 10/2010 | Kimmich et al. | 375/240.01 |
| 2011/0045802 | A1 * | 2/2011 | Bland et al. | 455/412.1 |
| 2011/0064020 | A1 * | 3/2011 | Suga | 370/315 |
| 2011/0119395 | A1 * | 5/2011 | Ha et al. | 709/231 |
| 2012/0209907 | A1 * | 8/2012 | Andrews et al. | 709/204 |
| 2012/0250690 | A1 | 10/2012 | Suh et al. | |
| 2012/0317272 | A1 * | 12/2012 | Funk et al. | 709/224 |

FOREIGN PATENT DOCUMENTS

| | | |
|---|---|---|
| KR | 10-2008-0066718 A | 7/2008 |
| KR | 10-2009-0010913 A | 1/2009 |
| WO | 2011068355 A2 | 6/2011 |

OTHER PUBLICATIONS

IEEE Std 802. Nov. 2007.*
Unavailable, Technology Under Considerations on MPEG Media Transport, IEEE, Apr. 16, 2011, pp. 1-30, No. N11954, Sophia Antipolis Cedex, France.
Yonghun Lee et al., Response to CfPs on MPEG Media Transport (MMT), 95. MPEG Meeting, Jan. 24, 2011-Jan. 28, 2011, Daegu.
Doug Young Suh et al., NAL Comptable to Qos Controlled Network, 3. JVT Meeting, 60. MPEG Meeting, Jun. 5, 2002-Oct. 5, 2002, Fairfax, US.
Jaeyeon Song et al., Response to CfPs on MPEG Media Transport (MMT), 95. MPEG Meeting, Jan. 24, 2011-Jan. 28, 2011, Daegu.

* cited by examiner

METHOD AND APPARATUS FOR TRANSMITTING DATA PACKET OF MULTIMEDIA SERVICE USING MEDIA CHARACTERISTICS

PRIORITY

This application claims the benefit under 35 U.S.C. §119 (a) of a Korean patent application filed in the Korean Industrial Property Office on Jun. 14, 2011 and assigned Serial No. 10-2011-0057699, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd., and 2) University-Industry Cooperation Group of Kyung Hee University.

BACKGROUND OF THE INVENTION

1. Field of the Invention

The present invention relates to a method and an apparatus for transmitting a data packet of a multimedia service. More particularly, the present invention relates to a method and an apparatus for guaranteeing transmission of a data packet and a service quality by using media characteristics for a multimedia service including one or more media content components.

2. Description of the Related Art

A multimedia service refers to a conversational service such as a video telephony service, a streaming service such as a Video On Demand (VOD) service, and a multicast and a broadcast service. A real time multimedia service may be a conversational service, an interactive service, and a streaming service according to a service type. The real time multimedia service may be divided into a unicast service, the multicast service, and the broadcast service according to a number of participants in a service.

IEEE 802.16 Worldwide Interoperability for Microwave Access (WiMAX), IEEE 802.11e Wireless Fidelity Transmission Opportunity (WiFi TXOP), 3GPP Universal Mobile Telecommunications System (UMTS), and 3GPP Long Term Evolution (LTE) each have functions for reserving resources for the multimedia service and guaranteeing the reserved resources.

In traffic specification (tspec), request specification (rspec), and flow specification (flowspec) of the Resource Reservation Protocol (RSVP) of the Internet Engineering Task Force (IETF), parameters used for the resource reservation protocol are defined. The parameters are compatible with IEEE 802.16, IEEE 802.11e, 3GPP UMTS UMTS, and 3GPP LTE communication system. Resources are reserved through a double leaky bucket parameter in IEEE 802.16, IEEE 802.11e, 3GPP UMTS UMTS, and 3GPP LTE communication system.

FIG. 1 illustrates a process of expressing data of a variable bitrate by using double leaky bucket parameters according to the related art.

Referring to FIG. 1, traffic of a Variable BitRate (VBR) is indicated by the double leaky bucket by using four parameters (Rg, Rp, Bp, and B) included in tspec of RSVP.

The Rg 101, which is a guaranteed bitrate, refers to a given average bitrate. Even when a bitrate of data temporarily exceeds the guaranteed bitrate Rg 101, it is possible to prevent occurrence of overflow by storing the data in a buffer. A required buffer size is prearranged as B 103. According to circumstances, the buffer size B 103 corresponding to the guaranteed bitrate may be indicated as Bg, which is a guaranteed buffer size. A peak bitrate Rp 105 may also be prearranged. Based on an assumption that the peak bitrate Rp 105 is retained within a cycle on which one packet is transferred, a buffer size Bp 107 for the peak bitrate may be determined as a maximum size of a Service Data Unit (SDU). In general, a value of the maximum size of the SDU may be indicated in a Maximum Transfer Unit (MTU).

Table 1 below shows examples of various protocols using the four parameters of the double leaky bucket.

TABLE 1

| | IETF RSVP, IEEE802.11e'tspec' | IEEE802.16 (WIMAX) | 3GPP UMTS & LTE | MPEG-4 OD | ATM |
|---|---|---|---|---|---|
| Rp | p | Min. reserved traffic rate | Maximum bitrate (4B) | avgBitrate | PCR |
| Bp | M | SDU size | Maximum SDU size | MAX_AU_SIZE | CDVT |
| Rg | r | Max. sustained traffic rate | Guaranteed bitrate (4B) | AverageBitRate | SCR |
| Bg | b | Maximum Latency | k*Maximum SDU | bufferSizeDB | BT |

Accordingly, for compatibility with a resource reservation protocol of a lower layer, the media characteristics should be configured in a form of parameters of the double leaky bucket in a multimedia content such as an MPEG (Moving Picture Experts Group) content.

SUMMARY OF THE INVENTION

Aspects of the present invention are to address at least the above-mentioned problems and/or disadvantages and to provide at least the advantages described below.

In accordance with an aspect of the present invention, a method of transmitting a data packet of a multimedia service is provided. The method includes generating a media characteristic corresponding to a single media content component or aggregated media characteristics corresponding to a plurality of multimedia content components, obtaining information used for generating the data packet from the generated media characteristics or aggregated media characteristics, and generating the data packet based on the obtained information used for generating the data packet and transmitting the generated data packet.

In accordance with another aspect of the present invention, an apparatus for transmitting a data packet of a multimedia service is provided. The apparatus includes an encapsulation layer for generating a media characteristic corresponding to a single media content component or aggregated media characteristics corresponding to a plurality of multimedia content components, a control layer for obtaining information used for generating the data packet from the generated media characteristics or aggregated media characteristics, and a delivery layer for generating the data packet based on the obtained information used for generating the data packet and transmitting the generated data packet.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
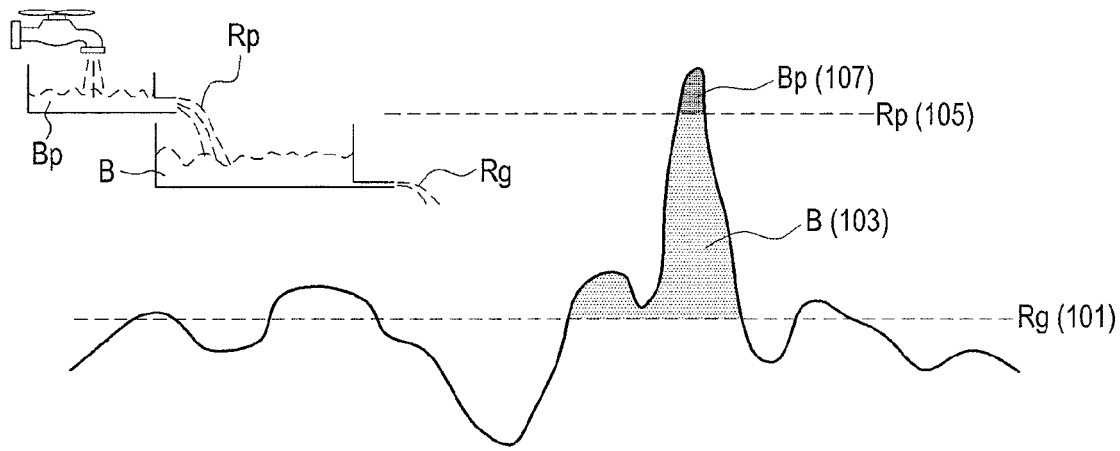
FIG. 1 illustrates a process of expressing bitrate data by the double leaky bucket parameter according to the related art.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A recent multimedia service takes a form of a mashup multimedia service. The mashup multimedia service may include a combination of various media content components such as a text, a UI (User Interface), and an application program as well as a typical combination in which an audio component and a video component are combined.

Since the combination of media content components varies depending on a state of a transport network, capability of a user terminal, and user preference, media characteristics for each combination are needed.

When a data packet of a multimedia service consisting of or including such various media content components is transmitted, information generated by combining media characteristics in each media content component is needed in order to use a resource reservation protocol supported by each network and a protocol for guaranteeing a service quality.

The "media characteristics" generated by combining media characteristics in various multimedia content components are defined herein as "aggregated media characteristics". A method of generating and using the aggregated media characteristics is described below.

The aggregated media characteristics may be a type of guideline providing a method of combining respective content components to a service provider and a user and also a multimedia service including a plurality of content components may be expressed by one aggregated media characteristic, which makes the multimedia service easily operated.

For example, when a streaming service for a stored media is performed, an easy access may be achieved by placing the aggregated media characteristics at the beginning of a content file of the stored media. In a case of a stored content encoded in advance, a value of the aggregated media characteristics may be determined based on information measured in an encoding process or generated through traffic shaping of each media data in a process of generating the aggregated media characteristics.

In a case of services encoding and transmitting a media content component in real time such as a live service (e.g. sports broadcasting) or a conversational service (e.g. a video conference), the aggregated media characteristics may be generated by collecting respective media characteristics from an encoder of each media content component and combining the collected media characteristics. Alternatively, the aggregated media characteristics may be generated through traffic shaping (that is, through a control according to a traffic characteristic) according to previously defined aggregated media characteristics.

The generated aggregated media characteristics may be used in a process of establishing a session of the multimedia service. An exemplary embodiment of using the generated aggregated media characteristics is described below.

Figure 2A:
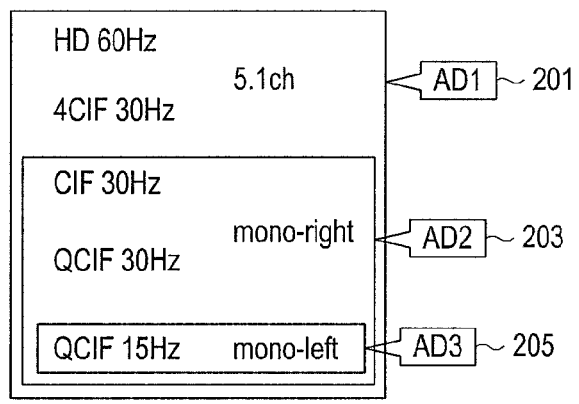
FIGS. 2A and 2B illustrate combinations of components available for a multimedia service including a plurality of media content components according to an exemplary embodiment of the present invention.
Figure 2B:
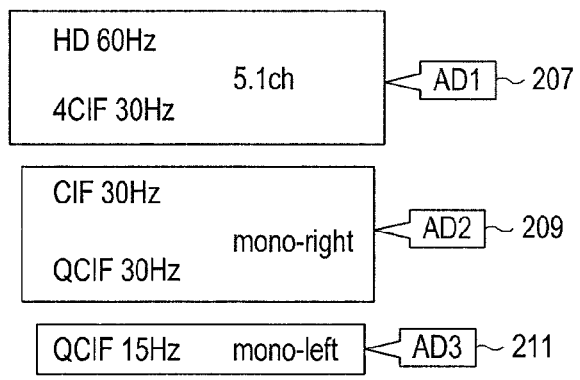

FIGS. 2A and 2B illustrate combinations of components available for a multimedia service including a plurality of media content components according to an exemplary embodiment of the present invention. FIG. 2A illustrates a case where a media content is scalable media, and FIG. 2B illustrates a case where the media content is simulcast media.

Referring to FIG. 2A, when the media content is scalable media, an AD3 combination 205 provides only a video of Quarter Common Intermediate Format (QCIF) 15 Hz and an audio of mono-left. An AD2 combination 203 provides videos of CIF 30 Hz and QCIF 30 Hz and an audio of mono-right as well as the video and audio of the AD3 combination 205. An AD1 combination 201 provides videos of HD (High-Definition) 60 Hz and 4CIF (4×CIF) 30 Hz and an audio of 5.1 ch as well as the videos and audios of the AD3 combination 205 and the AD2 combination 203.

Referring to FIG. 2B, when the media content is simulcast media, an AD3 combination 211 provides a video of QCIF 15 Hz and an audio of mono-left, an AD 2 combination 209 provides videos of CIF 30 Hz and QCIF 30 Hz and audios of mono-left and mono-right, and an AD1 combination 207 provides videos of HD 60 Hz and 4CIF 30 Hz and an audio of 5.1 ch.

When audio and video content components have various qualities, a combination of the content components may be diversely configured according to three factors (a network state, device capability, and user preference). For example, when a connected user having stable and sufficient available bitrates requires a high definition content, a service according to the AD1 combinations 201 and 207 shown in FIGS. 2A and 2B may be provided. In order to provide a seamless service to a user who desires to receive the service through a portable terminal in a mobile environment corresponding to a fickle network environment, service should be provided according to the AD3 combinations 205 and 211.

Accordingly, the aggregated media characteristics are needed to apply the resource reservation protocol of the lower layer and the protocol for guaranteeing the service quality to each of the combined content components in a situation where various qualities of service combinations are possible for one multimedia service.

When there is a media content component (e.g. a scalable video or a simulcast video) in which various qualities of services may be provided, aggregated media characteristics for each combination of the content components may be generated through the following method.

Hereinafter, it is assumed that there are inherent media characteristics for each media content component and each media characteristic is expressed by a double leaky bucket parameter. In a description related to the following equations, $Rg1$, $Rg2$, $B1$, $B2$, $Rp1$, $Rp2$, $Bp1$, $Bp2$, PLR (Packet Loss Ratio)1, PLR2, P1, P2, D1, and D2 refer to "media characteristics", respectively, and $Rg$, $B$, $Rp$, $Bp$, PLR, P, and D refer to "aggregated media characteristics".

Guaranteed (or sustainable) bitrate $Rg=Rg1+Rg2$ the guaranteed bitrate may be expressed by adding two guaranteed bitrates.

Buffer size $B=(B1+B2)*a$ $(a \leq 1)$ in the buffer size, it is safe to add two buffer sizes (wherein a=1). However, when different interleaving methods are applied to respective media streams or time points when the respective media streams are stored in a buffer are different due to a different state of a transmission channel, moments when the buffers are actually full are not the same, so that the required buffer size B may be less than the sum of the two buffer sizes by a ratio of a (wherein a<1).

Peak bitrate $Rp=(Rp1+Rp2)*b$ $(b \leq 1)$ or $Rp=Rg+\max(Rp1-Rg1, Rp2-Rg2)$ (1) in the peak bitrate, it is safe to add two peak bitrates (wherein b=1). However, when different interleaving methods are applied to respective media streams or time points when the respective media streams are stored in a buffer are different due to a different state of a transmission channel, moments when the two bitrates become peak are different. Accordingly, the actual peak bitrate may be less than the sum of the two peak bitrates by a ratio of b (b<1).

(2) a second equation ($Rp=Rg+\max(Rp1-Rg1, Rp2-Rg2)$) corresponds to a method of obtaining Rp based on an assumption that, when one bitrate becomes peak, the other bitrate has the guaranteed bitrate. In a video packet, for example, since the peak bitrate is determined by a size of an I frame (Intra-frame) and a size of a P/B frame is close to the guaranteed bitrate, a result in accordance with an actual environment may be obtained through the second equation.

Peak buffer (or MTU) size $Bp=(Bp1+Bp2)*g$ $(g \leq 1)$ or $Bp=\max(Bp1, Bp2)$ if two peaks appear simultaneously, $Bp=Bp1+Bp2$ (wherein g=1). Further, when different interleaving methods are applied to respective media streams or time points when the respective media streams are stored in a buffer are different due to a different state of a transmission channel, two peaks do not appear at the same time, so that the first equation with g<1 may be used. Alternatively, the aggregated peak buffer (or MTU) size may be expressed by the second equation ($Bp=\max(Bp1, Bp2)$).

Figure 3:
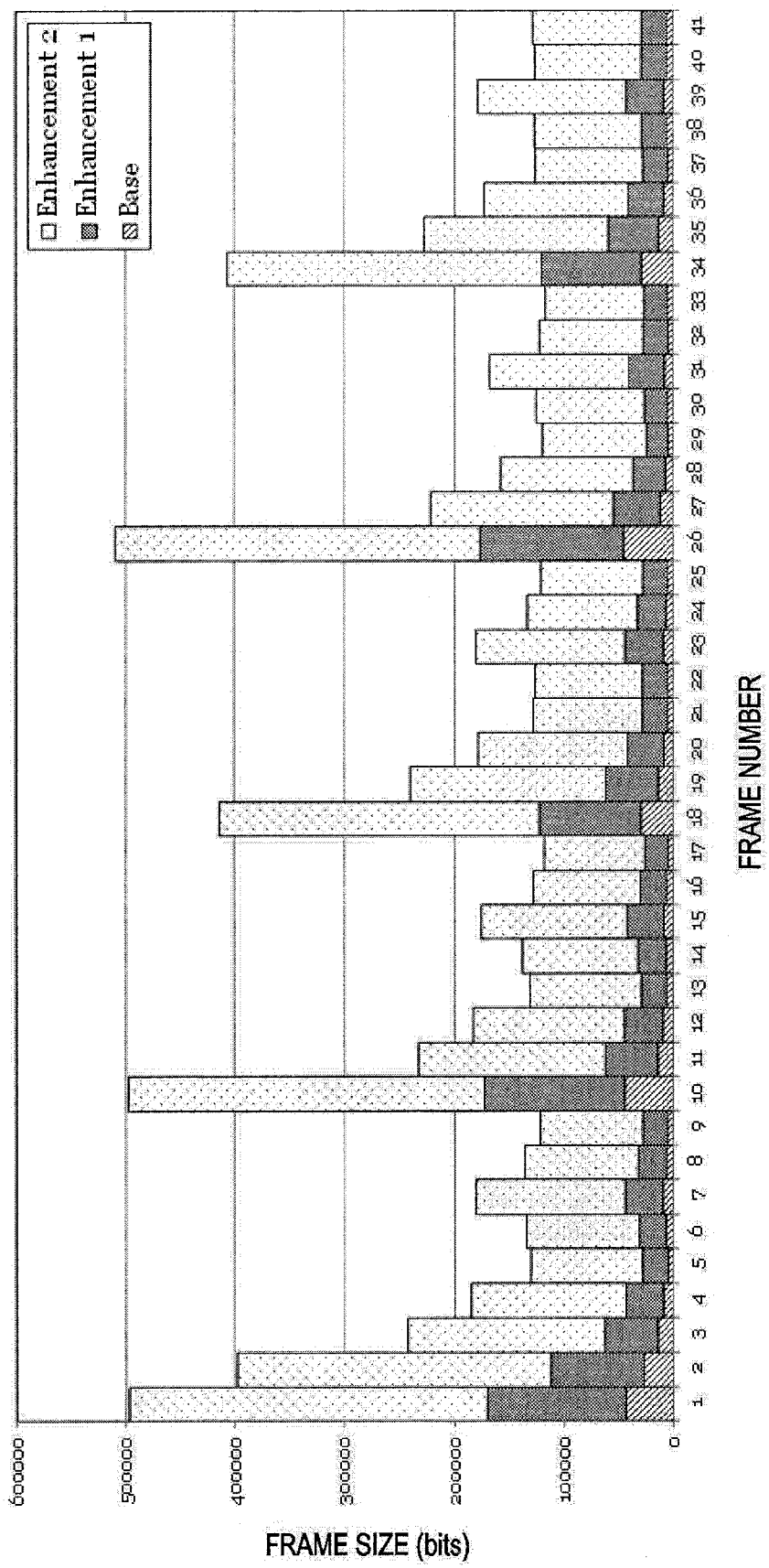
FIG. 3 illustrates an example of an integrated frame size when interleaving is not used in an aggregated stream including three layers according to an exemplary embodiment of the present invention.

FIG. 3 illustrates an example of an aggregated frame size or an aggregated data size when interleaving is not used in an aggregated stream including three layers (e.g. an SVC (Scalable Video Coding) base layer, an enhancement 1 layer, and an enhancement 2 layer) according to an exemplary embodiment of the present invention.

Figure 4:
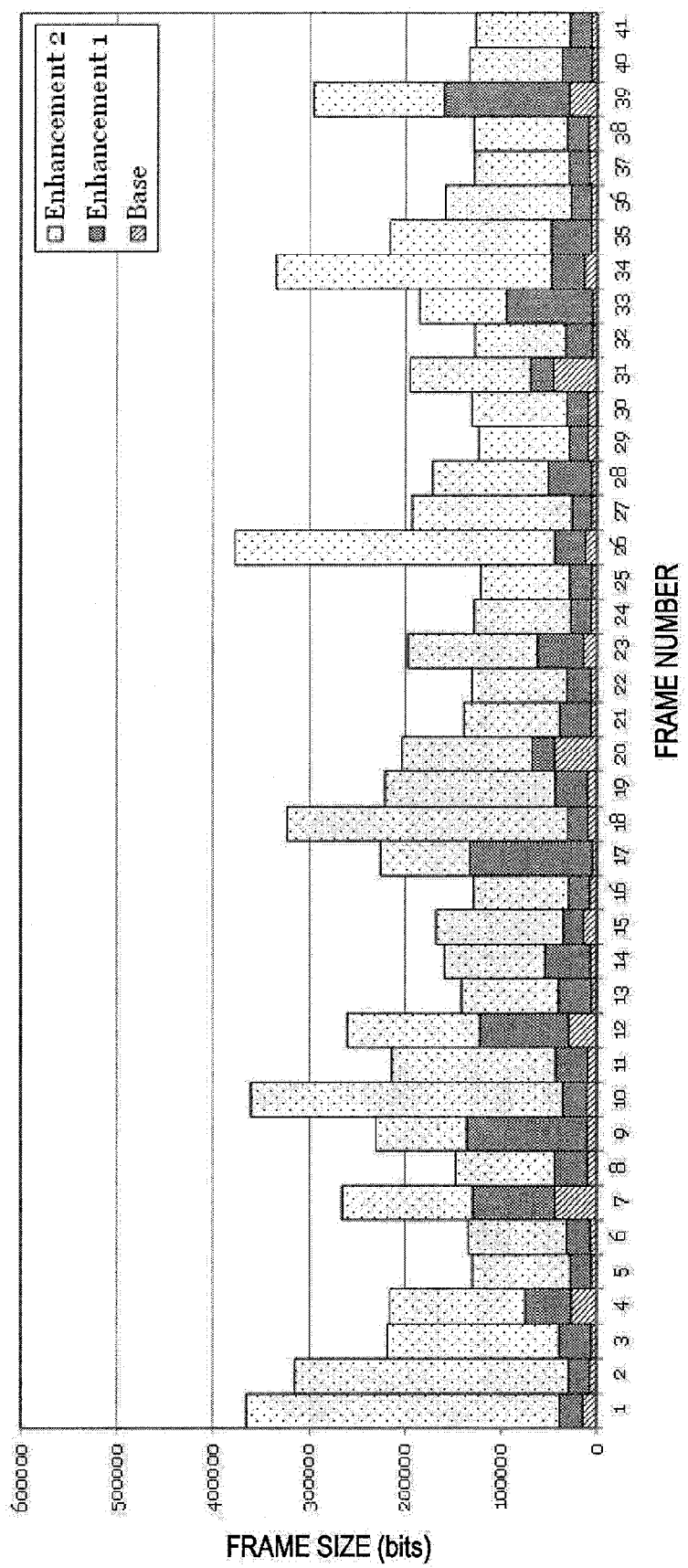
FIG. 4 illustrates an example of an integrated frame size when interleaving using a modulo operation is used in an aggregated stream including three layers according to an exemplary embodiment of the present invention.

FIG. 4 illustrates an example of an integrated frame size or an aggregated data size when interleaving using a modulo operation is used in an aggregated stream including three layers (e.g. an SVC base layer, an enhancement 1 layer, and an enhancement 2 layer) according to an exemplary embodiment of the present invention.

Referring to FIGS. 3 and 4, in order to assist the easy understanding of the four parameters (e.g. the guaranteed (or sustainable) bitrate, the buffer size, the peak bitrate, and the peak buffer or the MTU size) for the aggregated stream, FIGS. 3 and 4 illustrate a case where data of three SVC (Scalable Video Coding) layers is aggregated. FIG. 3 shows a case where three streams are aggregated without applying interleaving based on an assumption that the aggregated stream is transmitted through a single transmission channel. FIG. 4 shows a case where streams are aggregated by applying interleaving to streams of the SVC base layer and the enhancement 1 layer. At this time, the base layer applies interleaving of modulo 3, the enhancement 1 layer applies interleaving of modulo 6, and the enhancement 2 layer applies no interleaving in FIG. 4.

In FIG. 3, a peak size of each layer is generally generated in the same frame number. The peak size of each layer is generated in frame numbers 1, 10, 18, 26, 34, etc. In FIG. 4, positions of frames where peak sizes of respective layers are generated are different. While a peak size of the enhancement 1 layer is generated in frame number 9, a peak size of the enhancement 2 layer is generated in frame number 10 in FIG. 4. Accordingly, when the interleaving is applied, a, b, and g in the equations of obtaining the aggregated media characteristics may have values less than 1.

$$\text{Maximum PLR} = \min(PLR1, PLR2)$$

in order to guarantee a desired quality, a minimum value of an acceptable maximum PLR (maximum packet loss ratio) is selected. When there are one or more maximum PLR parameters, the minimum value of the maximum PLR parameters becomes a maximum PLR of the aggregated stream (content).

$$\text{Priority } P = \max(P1, P2)$$

in order to guarantee a desired quality, an acceptable relative priority follows a high priority. When there are one or more priority parameters, a maximum value of priorities becomes the priority of the aggregated stream (content).

$$\text{Maximum delay } D = \min(D1, D2)$$

the maximum delay is applied to a whole session as one value. There may be three services, such as an optional (conversational) service, a streaming service, and a download service. The conversational service allows an end-to-end delay up to 150 ms. The streaming service allows a delay of 1 to 10 seconds. The download service has no condition for a delay. A live streaming follows a streaming standard. When a maximum delay is large, a peak buffer size is increased and thus a peak bitrate is decreased so that the maximum delay may be reduced. When there are one or more maximum delay parameters, a minimum value of the maximum delay parameters becomes the maximum delay of the aggregated stream (content).

A syntax for specifying the media characteristics and the aggregated media characteristics and semantics for each field are described below with reference to Table 2.

Since a name and a size of each field, and a type of parameter indicating each field in Table 2, are selected considering their functions in embodiments of the present invention as described above, they may vary depending on the intention or usual practice of a user or an operator. However, the semantics of each field should follow the definition provided herein.

TABLE 2

| media_characteristics ( ) { | size (bits) | type |
|---|---|---|
| composition_flag | 1 | flag bit |
| max_packet_lost_ratio / max_lost_packet_number | 32 | float/ unsigned integer |
| stream_priority / stream_precedence | 6 | unsigned integer |
| token_bucket_rate | 32 | float |
| token_bucket_size | 32 | float |
| peak_data_rate | 32 | float |
| max_packet_size | 32 | unsigned integer |
| if ( composition_flag == 1 ) { | | |
| num_of_streams | 8 | unsigned integer |
| for ( Idx = 0; Idx < num_of_streams; Idx++) { | | |
| stream_id[Idx] | 8 | unsigned integer |
| } | | |
| } else { | | |
| stream_id | 8 | unsigned integer |
| } | | |
| } | | | composition_flag: denotes a field indicating whether media characteristics are aggregated media characteristics, and is expressed by a flag bit. When a value of the composition flag field is "0", the media characteristics indicate a media characteristic for a single stream. When the value of the composition flag file is "1", the media characteristics indicate aggregated media characteristics.

Although it is described as an example that the composition flag indicates whether the media characteristics are the aggregated media characteristics, the composition flag may indicate other information on whether a resolution is supported. Further, information indicated by the composition flag is defined in Configuration Information (CI).

max_packet_lost_ratio/max_lost_packet_number: denotes a field indicating a maximum packet loss ratio acceptable by the media providing (or transmitting) a service or a maximum number of lost packets. For example, it may correspond to a parameter related to a loss ratio used when resources are reserved in IEEE 802.16 communication system.

stream_priority/stream_precedence: denotes a field indicating priority information of a corresponding stream in a multi-stream, and may use a Differentiated Services Code Point (DSCP) defined in Request for Comments (RFC) 2474 of the IETF for compatibility with the protocol of the lower layer. Since the DSCP includes Per-Hop Behavior (PHB) and drop precedence for a corresponding packet, the PHP and the drop precedence may be allocated the priority of a corresponding media component. A reason why a size of the priority/precedence field is set to 6 bits in Table 2 is to maintain compatibility with a priority protocol of the network. For example, when a priority table defined in the DSCP of the RFC 2474 is used, a number of distinguished priorities is twenty one.

token_bucket_rate: denotes a field indicating a guaranteed bitrate which should be consistently guaranteed for a media service, and is expressed in the unit of Kbits/sec.

token_bucket_size: denotes a field indicating a depth of a token bucket, and is expressed in the unit of kilobits. A client may set a buffer size based on the field information.

peak_data_rate: denotes a field indicating a maximum instantaneous transmission rate, and is expressed in the unit of Kbits/sec. A client may set the buffer size based on the field information.

max_packet_size: denotes a field indicating a maximum packet size, and is expressed in the unit of kilobits.

num_of_streams: denotes a field indicating a number of aggregated streams, and exists only when a value of the composition_flag indicating whether the media characteristics are aggregated media characteristics is "1".

stream_id: denotes a field indicating stream_id of each stream included in the aggregated stream. When a value of the composition_flag indicating whether the media characteristics are aggregated media characteristics is "1", a number of stream_id corresponds to a value of the num_of_streams field. In other words, stream_id refers to an identifier for each media component included in aggregated media data. In an MPEG-2 Transport Stream (TS), for example, stream_id has the same function as that of a Packet ID (PID). Further, in an MPEG Media Transport (MMT), stream_id refers to an id for each MMT asset included in an MMT item.

A method of generating and using the media characteristics according to an exemplary embodiment of the present invention is described below. The media characteristics may be generated in a generation (capture or grab) process of the content or an encapsulation process of media data encoded in advance.

An exemplary embodiment of the present invention introduced in the following description will be discussed based on the MMT. An encapsulation layer, a delivery layer, and a control layer divided according to their functions internally in the MMT are described, respectively.

Figure 5:
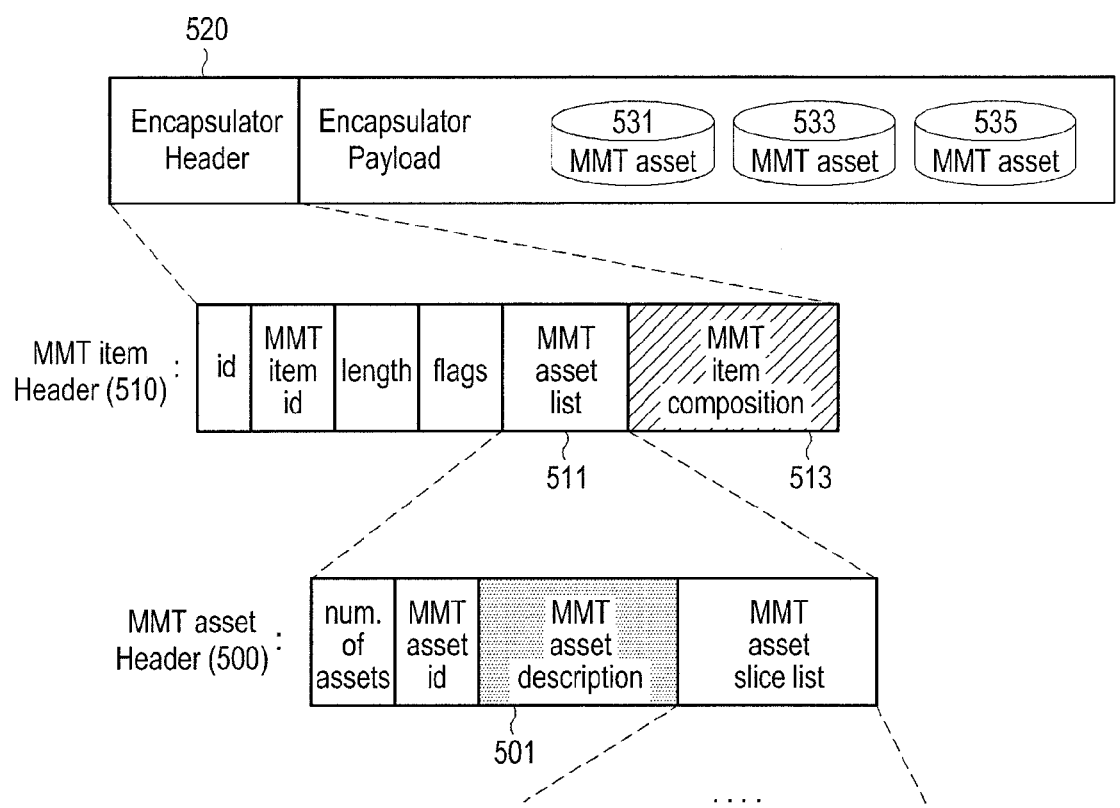
FIG. 5 illustrates an example of a header structure of an MMT encapsulation layer according to an exemplary embodiment of the present invention.

FIG. 5 illustrates an example of a header structure of the MMT encapsulation layer according to an exemplary embodiment of the present invention.

Referring to FIG. 5, the MMT encapsulation layer generates the media characteristics and the aggregated media characteristics proposed in exemplary embodiments of the present invention. Each of the MMT assets 531, 533, and 535 in the MMT refers to an unit of each media. Accordingly, the media characteristic for a single media may exist for each MMT asset. An encapsulator header 520 may include an MMT item header 510 and an MMT asset header 500.

The MMT asset header 500 includes an MMT asset description field 501. The media characteristic for a single MMT asset may be described in the MMT asset description field 501. Accordingly, when the MMT item includes the single MMT asset, it is possible to use the media characteristics included in the MMT asset description field 501 of the MMT asset header 500.

Since the MMT item may include one or more MMT assets, the MMT item header 510 includes MMT asset list information 511. Information (e.g. temporal or spatial presentation information) on the relation between respective MMT assets included in the MMT item is provided as MMT item composition information 513. The aggregated media characteristics may be located in the MMT item composition information 513.

The MMT control layer exchanges service discovery information, Quality of Experience (QoE) management information, and Digital Rights Management (DRM) information between an MMT server and an MMT client. In a process of exchanging the service discovery information, the MMT control layer may perform a network resource reservation for establishing a session. Accordingly, the MMT control layer obtains the (aggregated) media characteristics to be served by parsing information of the MMT item composition field 513 of the MMT item header 510 or information of the MMT asset description field 501 of the MMT asset header 500, and performs the resource reservation using the obtained media characteristics.

The MMT delivery layer transmits an encapsulated media data packet from a server to a client and exchanges information between layers (e.g. an interface between layers) within a terminal Accordingly, the delivery layer generates a delivery packet. The delivery packet parses information, which should be included for each delivery packet, from the (aggregated) media characteristics included in the MMT item composition field 513 of the MMT item header 510 or the MMT asset description field 501 of the MMT asset header 500, and then uses the parsed information.

The information, which should be included in each delivery packet, includes a priority distinguisher and a delivery delay distinguisher. When the resource reservation is implemented through the control layer, a distinguisher for a reserved flow is needed. When the delivery layer reserves resources for the MAC/PHY layer according to a cross-layer design, (aggregated) media characteristics for the MMT item (or MMT asset) are needed.

Figure 6:
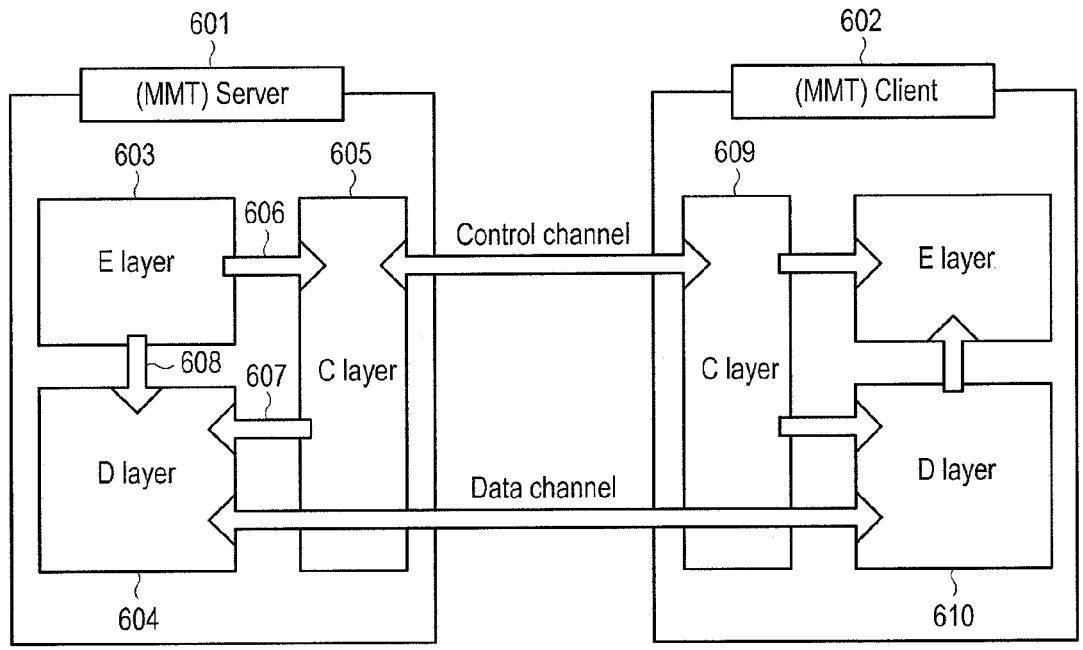
FIG. 6 illustrates an example of using media characteristics, which are generated in the MMT encapsulation layer, during a media transmission service process according to an exemplary embodiment of the present invention.

FIG. 6 illustrates an example of using media characteristics, which are generated in the MMT encapsulation layer, during a media transmission service process according to an exemplary embodiment of the present invention.

Referring to FIG. 6, the (aggregated) media characteristics are generated in an encapsulation layer 603 of an MMT server 601 side. The generated media characteristics may be located in the MMT item composition field 513 or the MMT asset description field 501 within the encapsulator header 520.

The generated media characteristics are included in information (e.g., the double leaky bucket parameter) used in the process of establishing a session of a media service and each delivery packet so that they may be distinguished into information (e.g., stream_priority/stream_precedence) indicating a relative priority for each packet.

In a case of the information used in the session establishment process, the media characteristics are transmitted (606) to a control layer (C layer) 605. The control layer 605 parses a value of a field corresponding to the information used in the session establishment process and transfers the parsed value to a control layer 609 of a client 602 through a signaling via a control channel or a protocol (e.g., a Real-Time Stream Protocol (RTSP) or a Session Initiation Protocol (SIP)).

In a case of information (e.g. stream_priority/stream_precedence of Table 2) which may be used in every delivery packet, the generated media characteristics are transferred (606) to the control layer 605. The control layer 605 parses a value of a field corresponding to information which may be used in every delivery packet and transfers (607) the parsed value to the delivery layer (D layer) 604. Alternatively, the delivery layer 604 directly receives (608) the encapsulator header 520 of the media characteristics generated by the encapsulation layer 603 and directly parses a value of a field corresponding to information which may be used in every delivery packet so that the information may be obtained. After inserting the information in every delivery packet (e.g., stream_priority/stream_precedence of Table 2, which may be used in every delivery packet), the delivery layer 604 may transmit the delivery packet to the client 602 (particularly, the delivery layer 610 of the client) and/or entities of an intermediate network via the data channel.

Figure 7:
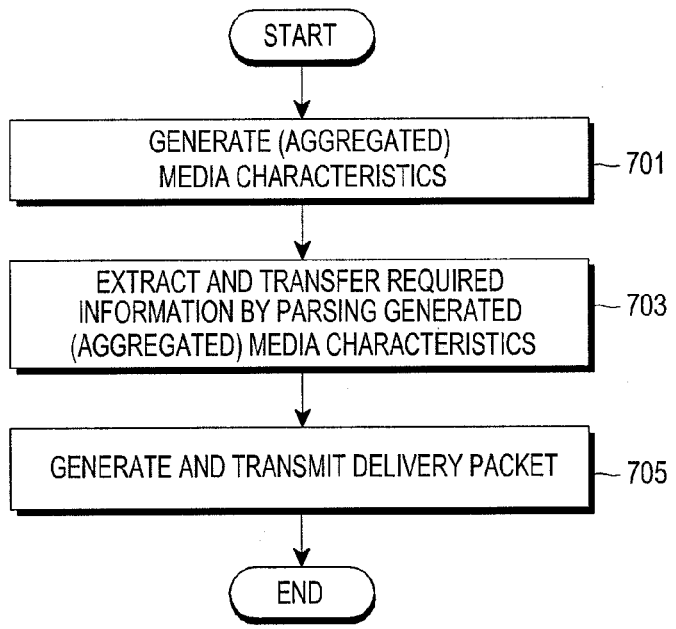
FIG. 7 is a flowchart illustrating a method of generating and using (aggregated) media characteristics of an MMT server according to an exemplary embodiment of the present invention.

FIG. 7 is a flowchart illustrating a method of generating and using (aggregated) media characteristics of an MMT server according to an exemplary embodiment of the present invention.

Referring to FIG. 7, the MMT server generates (aggregated) media characteristics for one or more multimedia content components in step 701. An operation of generating the media characteristics may be performed by the encapsulation layer of the MMT server.

The MMT server extracts information used for the session establishment process and information which may be used in every delivery packet by parsing the generated media characteristics in step 703. The information used for the session establishment may be transferred to the MMT client by using signaling via the control channel or the protocol. Operations of parsing and extracting the information may be performed by the control layer of the MMT server.

The MMT server generates the delivery packet and transmits the generated delivery packet to the MMT client in step 705. Operations of generating and transmitting the delivery packet are performed by the delivery layer of the MMT server. In generating the delivery packet, information such as stream_priority or stream_precedence parsed from the media characteristics generated in advance is used. The delivery layer may receive the information parsed by the control layer of the MMT server or obtain the information by parsing the media characteristics.

When the resource reservation for transmitting the media content is completed through the above procedures and a service is started, each delivery packet may use a packet identifier.

The packet identifier identifies whether a packet is included in a corresponding aggregated flow when resources are reserved and the packet is transmitted. A PID is used to distinguish packets including packets of a flow in which resources are reserved and packets which are not reserved, the packets being mixed in a network. The PID may be divided into an explicit part and an implicit part.

The explicit ID contains a totally arranged parameter regardless of a service or a session. The explicit ID is used for Quality of Service (QoS) per class such as DSCP of IETF diffServ. The explicit ID is used to differentiate a relative QoS. Here, a loss priority and a delay priority are used. The delay priority may be expressed by two bits (e.g., a conversational service, an interactive service, a streaming service, and a download service may be expressed by 11, 10, 01, and 00, respectively) since the delay priority uses three or four distinctions. The loss priority is classified into three steps (3GPP UMTS) or eight steps (diffServ) in the standard. Accordingly, the loss priority may be expressed by three bits and indicates high sensitivity to packet loss as a priority value is high.

The implicit ID is used for a guaranteed service. The implicit ID is used to utilize resources reserved in a corresponding flow. One label is assigned for each reserved flow. Semantics of the label have not been defined. A router, a base station, an AP (Access Point), etc. guarantee to use reserved resources for a corresponding label. Accordingly, when one packet is received, a label is identified, resources reserved for the label are identified, and then a service according to the reserved resources should be provided.

Since the router has only to distinguish flows (source IP address, destination IP address) through a temporary serial number when the flows are already determined for the label so that the flows do not overlap, only seven bits are sufficient. The implicit ID is assigned eight bits, wherein a first bit indicates whether such as label is used. The label may be similar to a label in label switching. Although label swapping is performed, a label recognized by an application layer of a terminal should be set in both end nodes.

The operation or the flowchart of the signal shown in FIGS. 6 and 7 does not limit the scope of the present invention. Operations described in FIGS. 6 and 7 merely illustrate operations performed by respective layers. Exemplary embodiments of the present invention are not limited to only a case of including all processes or a case where a certain process should be performed by a specific layer.

The aforementioned operations may be implemented by installing a memory device storing a corresponding program code in a component within a service device or a client device. An encapsulation layer (E layer), a control layer (C layer), and a delivery layer (D layer) which are respective layers of the server device or the client device read and execute the program code stored in the memory device through a processor or a CPU (Central Processing Unit) so that the aforementioned operations may be implemented.

Accordingly, exemplary embodiments of the present invention have the following representative effects. Exemplary embodiments of the present invention may provide an adaptive multimedia service according to a network state, capability of a terminal, and characteristics of a user by utilizing aggregated media characteristics during a process of transmitting multimedia data including a plurality of media content components.

Exemplary embodiments of the present invention may also generate media characteristics by using the double bucket parameter, so that transmission data of the combined multimedia content components may be easily compatible with the resource reservation protocol provided by the lower network, and the resources and the QoS protocol for guaranteeing a service quality may be easily used.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of transmitting a data packet of a multimedia service, the method comprising:
generating an encapsulator header including an aggregated media characteristic by combining media characteristics of a plurality of media content components; and
transmitting the data packet including information related with the aggregated media characteristic and a flag indicating whether the data packet includes the aggregated media characteristic,
wherein the information is obtained by parsing at least one of the encapsulation header and the data packet, and
wherein the data packet further includes the plurality of media content components and the aggregated media characteristic.

2. The method as claimed in claim 1, wherein, if the flag indicates that the data packet includes the aggregated media characteristic, the information further includes a stream_priority indicating a priority of a corresponding stream in multi streams included in the data packet.

3. The method as claimed in claim 1, wherein the aggregated media characteristic includes at least one of a guaranteed bitrate, a buffer size, a peak bitrate, and a peak buffer size.

4. The method as claimed in claim 3, wherein the guaranteed bitrate (Rg) is generated through an equation of $Rg=Rg1+Rg2$, where $Rg1$ is a guaranteed bitrate of a first multimedia content component and $Rg2$ is a guaranteed bitrate of a second multimedia content component.

5. The method as claimed in claim 3, wherein the buffer size (B) is generated through an equation of $B=(B1+B2)*a$, where $B1$ is a buffer size of a first multimedia content component, $B2$ is a buffer size of a second multimedia content component, and a is a value larger than 0 and equal to or less than 1.

6. The method as claimed in claim 3, wherein the peak bitrate (Rp) is generated through at least one equation of $Rp=(Rp1+Rp2)*b$ and $Rp=Rg +\max(Rp1-Rg1, Rp2-Rg2)$, where $Rp1$ is a peak bitrate of a first multimedia content component, $Rp2$ is a peak bitrate of a second multimedia content component, b is a value larger than 0 and equal to or less than 1, and max( ) is a function of selecting a maximum value from factors.

7. The method as claimed in claim 4, wherein the peak buffer size (Bp) is generated through at least one equation of $Bp=(Bp1+Bp2)*g$ and $Bp=\max(Bp1, Bp2)$, where $Bp1$ is a peak buffer size of a first multimedia content component, $Bp2$ is a peak buffer size of a second multimedia content component, g is a value larger than 0 and equal to or less than 1, and max( ) is a function of selecting a maximum value from factors.

8. An apparatus for transmitting a data packet of a multimedia service, the apparatus comprising:
- an encapsulation entity for generating an encapsulator header including an aggregated media characteristic by combining media characteristics of a plurality of media content components; and
- a delivery entity for transmitting the data packet including information related with the aggregated media characteristic and a flag indicating whether the data packet includes the aggregated media characteristic,
- wherein the information is obtained by parsing at least one of the encapsulation header and the data packet, and
- wherein the data packet further includes the plurality of media content components and the aggregated media characteristic.

9. The apparatus as claimed in claim 8, wherein, if the flag indicates that the data packet includes the aggregated media characteristic, the information further includes a stream_priority indicating a priority of a corresponding stream in multi streams included in the data packet.

10. The apparatus as claimed in claim 8, wherein the aggregated media characteristic includes at least one of a guaranteed bitrate, a buffer size, a peak bitrate, and a peak buffer size.

11. The apparatus as claimed in claim 10, wherein the encapsulation layer generates the guaranteed bitrate (Rg) through an equation of Rg=Rg1+Rg2, where Rg1 is a guaranteed bitrate of a first multimedia content component and Rg2 is a guaranteed bitrate of a second multimedia content component.

12. The apparatus as claimed in claim 10, wherein the encapsulation layer generates the buffer size (B) through an equation of B=(B1+B2)*a, where B1 is a buffer size of a first multimedia content component, B2 is a buffer size of a second multimedia content component, and a is a value larger than 0 and equal to or less than 1.

13. The apparatus as claimed in claim 10, wherein the encapsulation layer generates the peak bitrate (Rp) through at least one equation of Rp =(Rp1+Rp2)*b and Rp=Rg+max (Rp1−Rg1, Rp2−Rg2), where Rp1 is a peak bitrate of a first multimedia content component, Rp2 is a peak bitrate of a second multimedia content component, b is a value larger than 0 and equal to or less than 1, and max( )is a function of selecting a maximum value from factors.

14. The apparatus as claimed in claim 10, wherein the encapsulation layer generates the peak buffer size (Bp) through at least one equation of Bp=(Bp1+Bp2)*g and Bp=max(Bp1, Bp2), where Bp1 is a peak buffer size of a first multimedia content component, Bp2 is a peak buffer size of a second multimedia content component, g is a value larger than 0 and equal to or less than 1, and max( )is a function of selecting a maximum value from factors.

* * * * *